W. F. SCHALLER.
BAKER'S OVEN.
APPLICATION FILED NOV. 27, 1920.
1,428,063.
Patented Sept. 5, 1922.
6 SHEETS—SHEET 5.
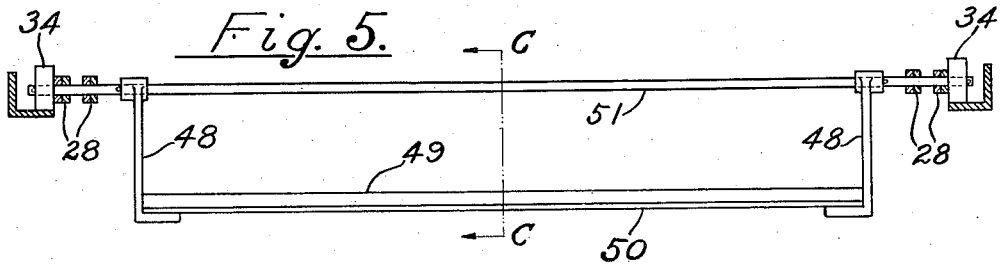
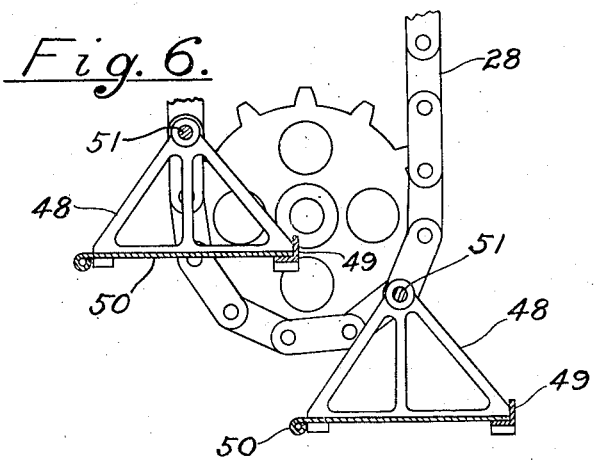
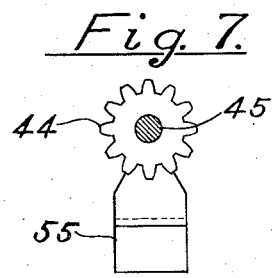
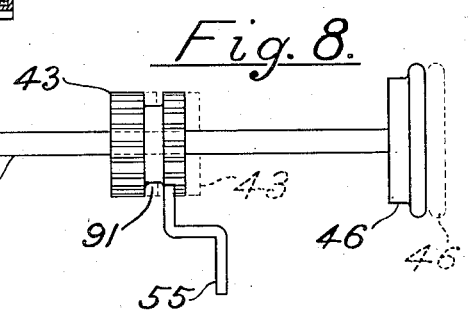
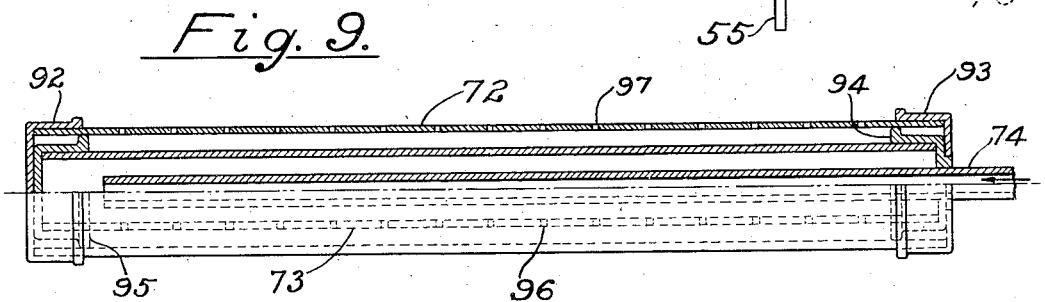
Inventor:
William F. Schaller,
BY Bryant Pinkney,
His Attorney W. F. SCHALLER.
BAKER'S OVEN.
APPLICATION FILED NOV. 27, 1920.
1,428,063.
Patented Sept. 5, 1922.
6 SHEETS—SHEET 6.
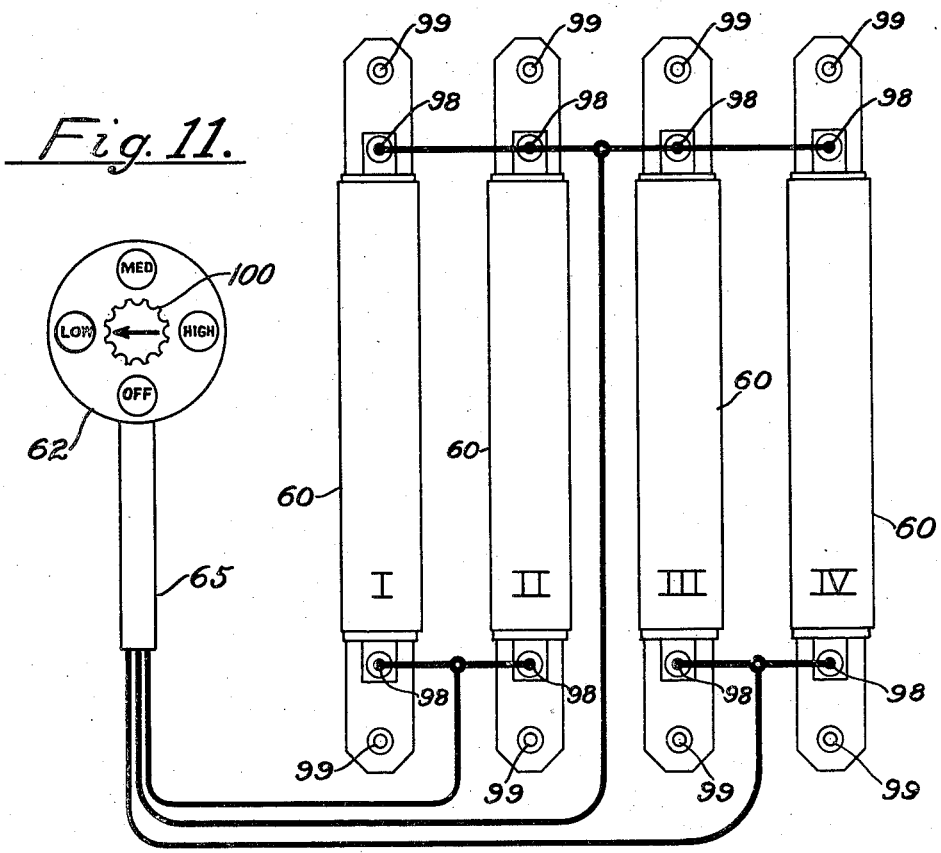
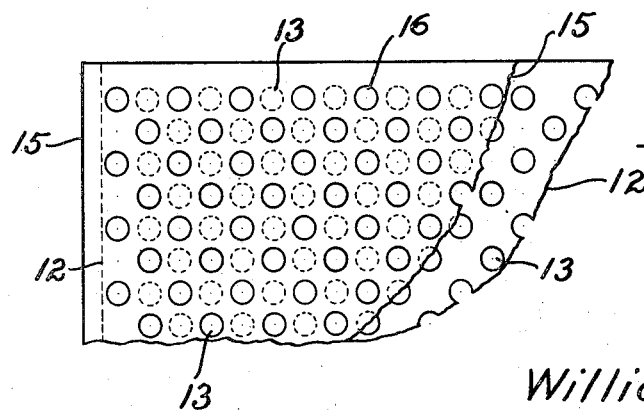
Inventor:
William F. Schaller,
By Bryan S. Pinkney,
His Attorney.

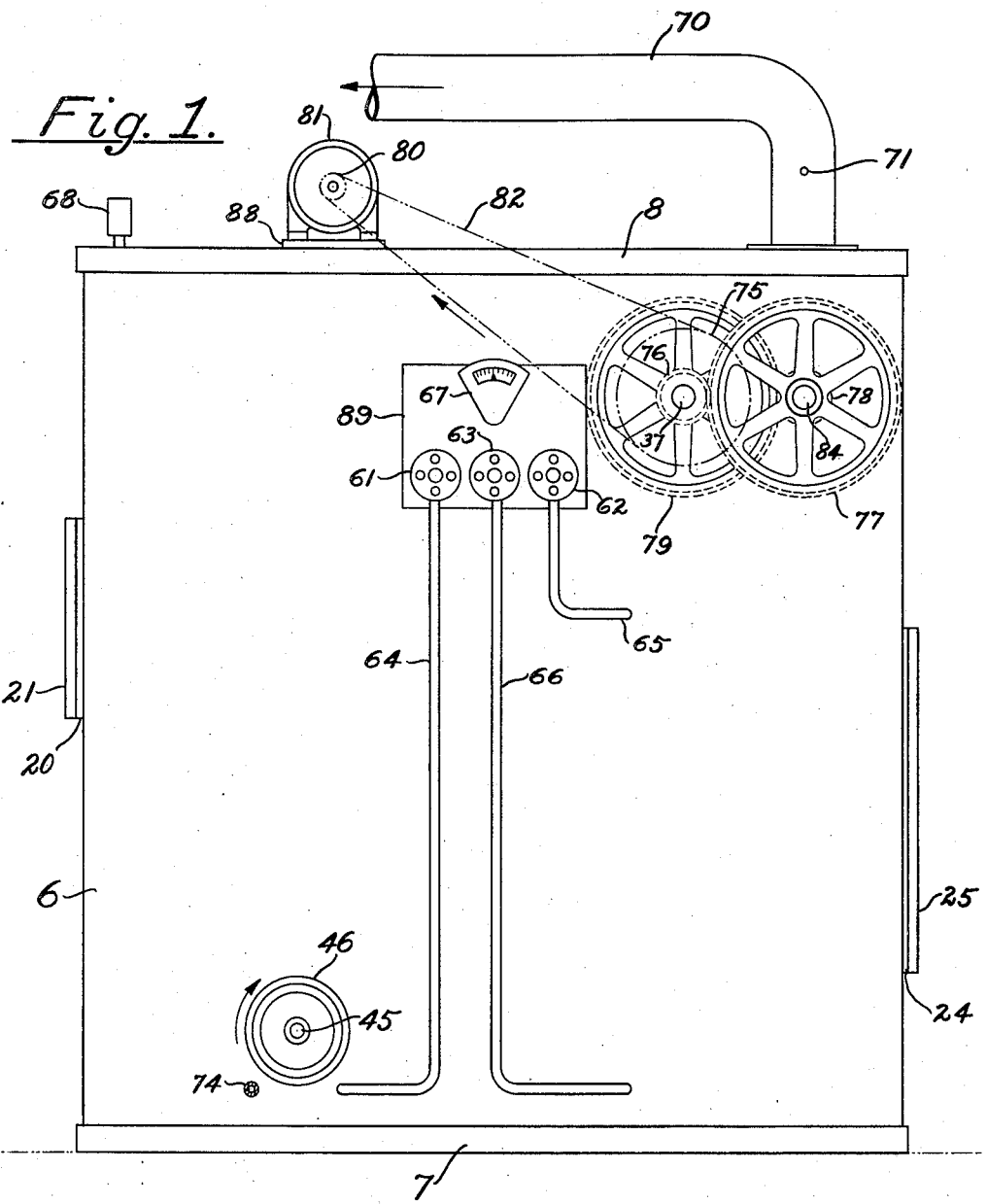

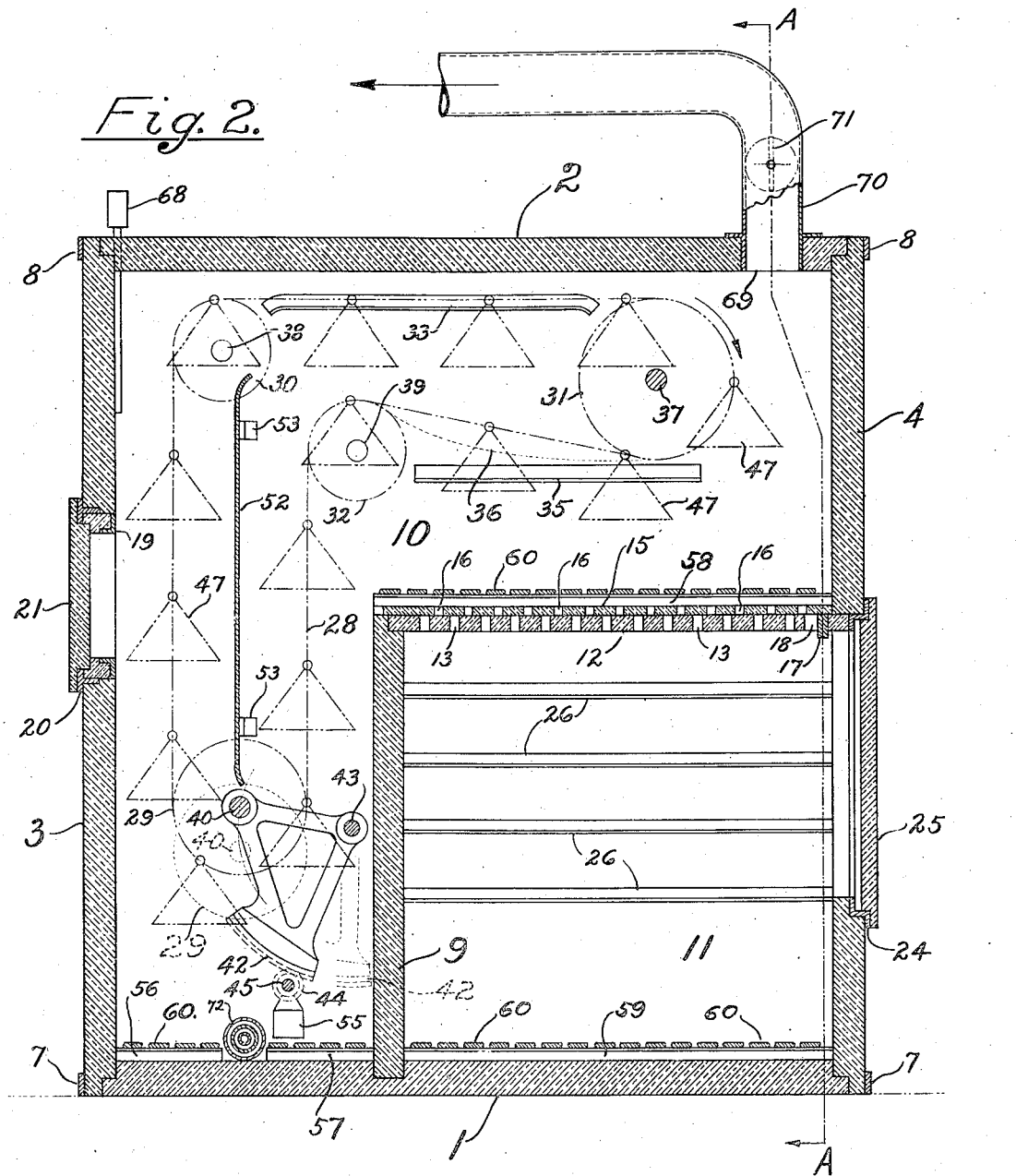

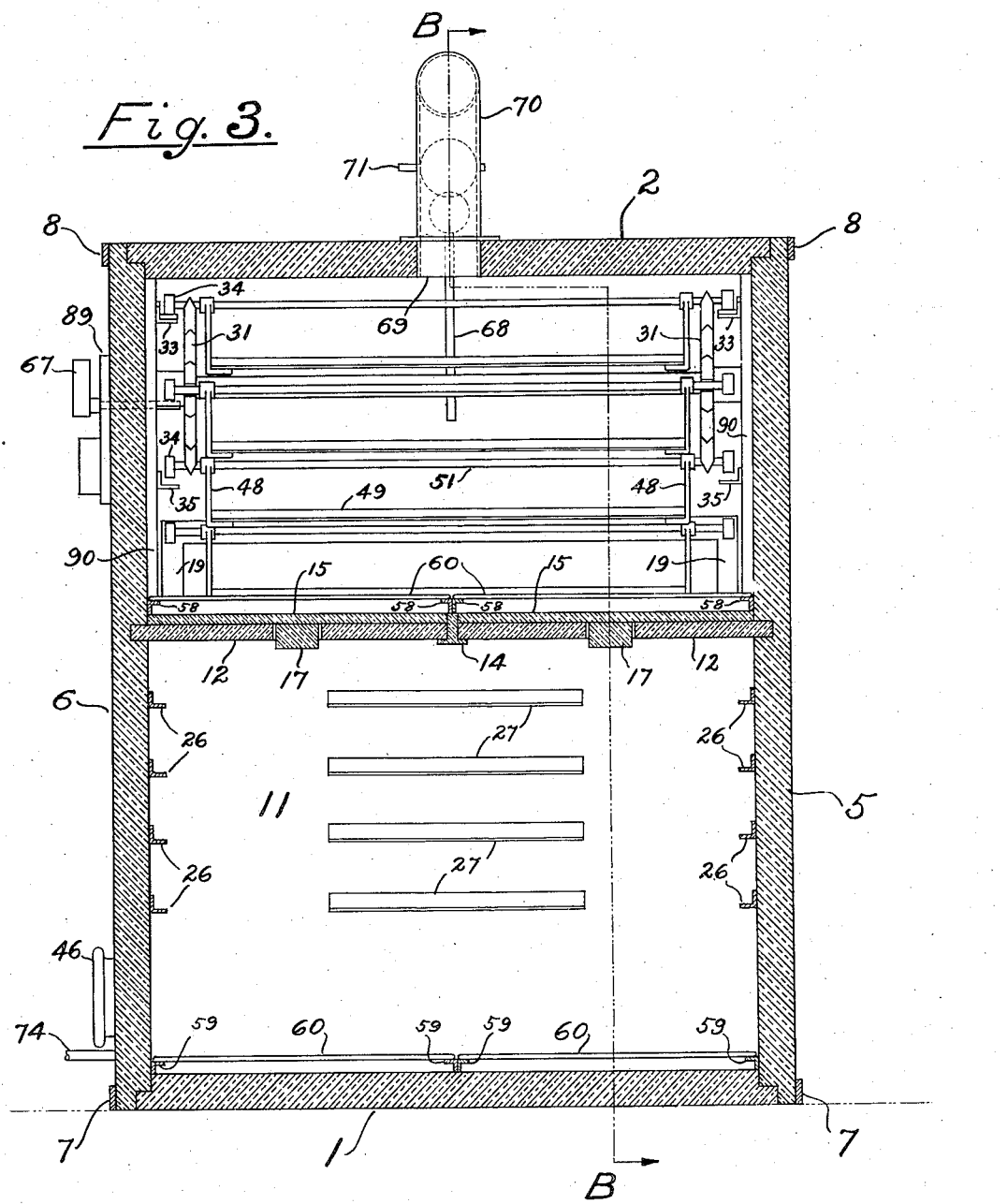

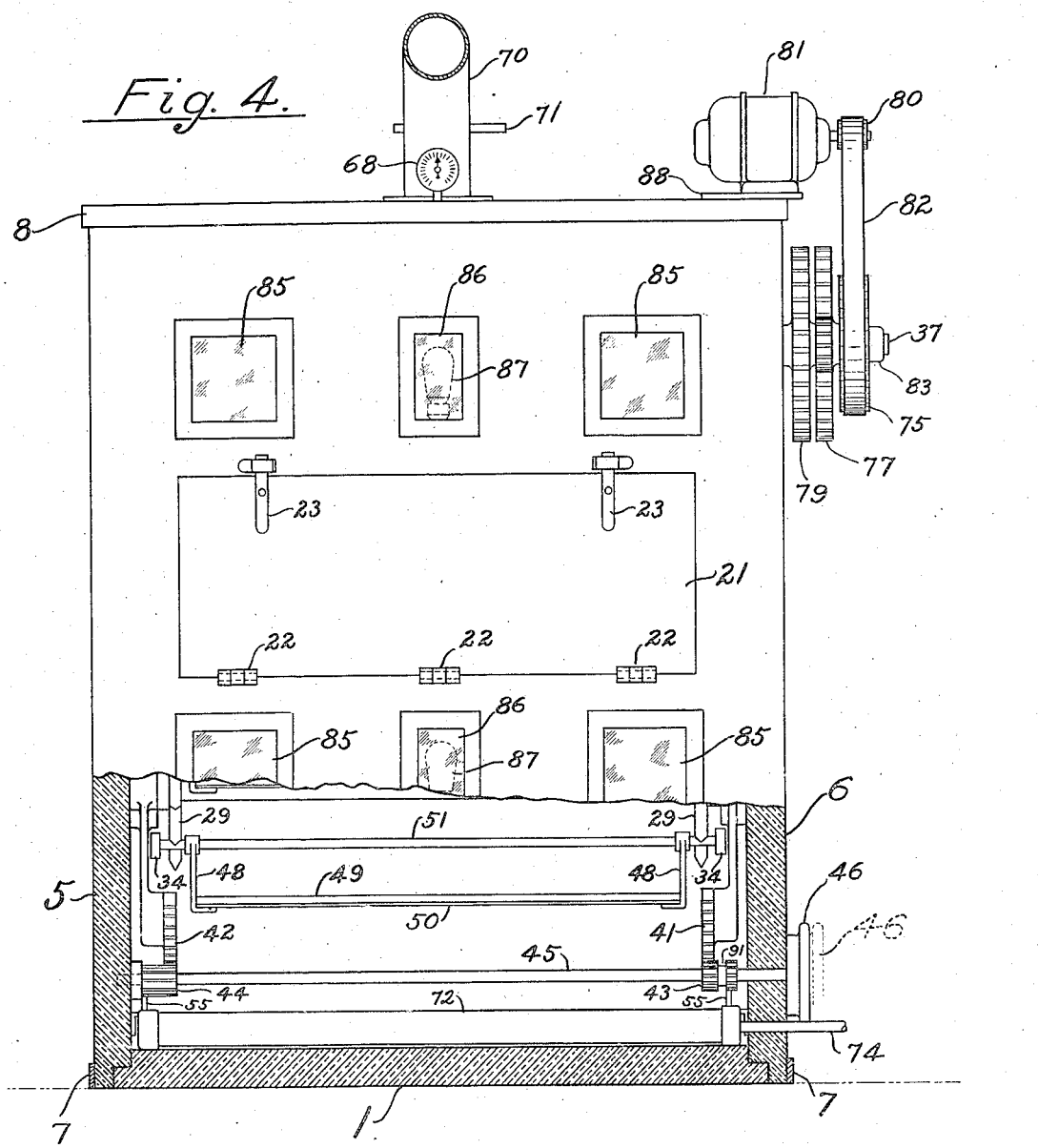

Patented Sept. 5, 1922.

1,428,063

UNITED STATES PATENT OFFICE.

WILLIAM F. SCHALLER, OF SAN FRANCISCO, CALIFORNIA, ASSIGNOR OF ONE-HALF TO ELIZABETH SCHALLER, OF SAN FRANCISCO, CALIFORNIA.

BAKER'S OVEN.

Application filed November 27, 1920. Serial No. 426,855.

*To all whom it may concern:*

Be it known that I, WILLIAM F. SCHALLER, a citizen of the United States, residing at San Francisco, in the county of San Francisco and State of California, have invented certain new and useful Improvements in a Baker's Oven, of which the following is a specification.

My invention relates to a baker's oven of the traveling chain type wherein a plurality of carriers are employed in connection with an endless traveling chain, and carried through a suitable baking chamber of the required temperature.

The objects of my invention are, first, to provide a traveling chain oven which will shift the bread or other materials from place to place in the baking chamber, thereby uniformly baking it; second, to provide means whereby the product being baked may be examined from time to time in order to determine its condition and remove same if necessary; third, to provide an auxiliary oven for cake and pastry baking, utilizing the waste space of the oven, and having means in common for heating both the oven and the auxiliary oven, and also independent means; fourth, to provide electrical heating elements that are so arranged as to require a minimum of heat to carry out the objects desired with means to control a plurality of various temperatures to suit specific needs; fifth, to provide humidifying means of simple and improved construction; and sixth, to provide a simple and efficient take-up for the traveling chain that may be either automatic or manually-operated.

I attain these objects by the mechanism illustrated in the accompanying drawings, in which—

Figure 1 is a side elevation of my improved bakers oven; Fig. 2, a transverse section taken at line B—B, Fig. 3; Fig. 3, a cross section taken at line A—A. Fig. 2; Fig. 4, a front view showing the lower portion broken away to illustrate the chain take-up mechanism; Fig. 5, a front view of the carrier and traveling chain; Fig. 6, an enlarged cross section of the carriers taken at line C—C, Fig. 5, also a sprocket and a part of the traveling chain; Fig. 7, a side view of the chain take-up pinion and lock-plate; Fig. 8, a front view of the chain take-up pinion and lock-plate; Fig. 9, an assembly, partially cross sectioned, of the steam generator for humidifying purposes; Fig. 10, a fragmentary view of the top section of the cake oven, showing the perforated top and the perforated damper plate; Fig. 11, a diagram of the heating elements, showing the wiring arrangement for the "high", "medium", "low" and "off" currents.

Similar numerals refer to similar parts throughout the several drawings.

Referring to the drawings, 1 is the bottom section of the oven body, 2 is the top section, 3 the front section, 4 the back section, 5 a side section and 6 the other side section. These sections consist of a special insulating material bound together with a lower strap 7 and a top strap 8. A lower section 9, the full width of the oven, and recessed in the side sections 5 and 6, and also in the bottom section 1 (as shown in Fig. 2), serves as a partition between the oven chamber 10 and the auxiliary oven chamber 11. The top partition of said auxiliary oven chamber is denoted by 12; and this top partition is perforated with perforations 13. I have shown the top partition 12 as consisting of two sections, resting on a supporting member 14, although the number of sections 12 comprising the top partition is not limited. On the top of sections 12 are mating perforated damper plates 15 with perforations 16. I have shown a projection 17 which operates in opening 18 to work the damper plates forward or backward to give the desired amount of heat intercommunication between the main oven chamber 10 and the auxiliary oven chamber 11.

An inner frame 19 and an outer frame 20 comprise the oven door frame, and a door 21 is hinged to the outer frame 20 by means of hinges 22 and latched by latches 23, or any other suitable means. The cake or auxiliary oven is provided with a door frame 24 and a door 25 is hinged to said door frame in a similar manner as door 21 is hinged to frame 20. Side angles 26 and rear angles 27 serve as supports on which suitable shelves or racks containing the cakes or pastry to be baked are placed.

A pair of endless traveling chains 28 are carried by means of sprockets 29, 30, 31 and 32. Side angles 33 serve as upper guides for the chain rollers 34, and side angles 35 serve as lower guides for the chain rollers. Angles 35 are placed below the normal line of the traveling chains 28 to permit of the "sag" 36, which I have found beneficial for the smooth running of the chains and carriers. Sprockets 31 are the drive sprockets and are mounted on a through shaft 37 which extends to the outside of the oven for drive purposes, described in detail later. Sprockets 30 and 32 are mounted on short shafts 38 and 39 respectively in any suitable manner, and hence not shown in detail. The take-up sprocket 29 is mounted on through shaft 40, which is carried by a take-up frame composed of side members 41 and 42, and loosely mounted on shaft 43 suitably mounted in the side sections of the oven. The side members 41 and 42 are provided with gear teeth for adjusting purposes, and are operated by pinions 43 and 44 mounted on shaft 45, which projects through the oven side, and is provided with handwheel 46 for operating purposes.

Carriers 47 are composed of side members 48, a back angle 49 and a shelf 50. The side members 48 are loosely mounted on a rod 51 carried by the chains 28 in any suitable manner, such as for example, by passing through the links of the chains 28. On the ends of the rod 51 are loosely mounted the rollers 34.

A baffle plate the full width of the oven, denoted by 52, is fastened to the oven sides by clips 53. This baffle plate serves to conserve the heat by preventing unnecessary heat loss when the door 21 is opened. Baffle plate 52 also serves as a back guide for the carriers 47 while they are being loaded with pans of bread.

The method of taking up slack in the chains is as follows: The handwheel 46 is pulled away from the side of the oven, as shown by the dotted lines in Fig. 4 and Fig. 8, and this causes the teeth of the pinions 44 and 43 to be drawn out of mesh with the lock-plates 55. Pinion 44 clears the lock-plate entirely and pinion 43 is provided with a groove 91 which allows clearance for the lock-teeth in lock-plate 55. Turning the handwheel 46 in the direction as shown by the arrow in Fig. 1 lowers the end of the side members 41 and 42 (which side members are pivoted on shaft 43) so that shaft 40 is lowered to suit specific requirements, and in Fig. 2 I have shown the shaft 40 dotted at its lowest position and the side member 42 dotted at its furthest take-up position. By leaving the pinions 44 and 43 out of mesh with the lock-plates 55 the traveling chains 28 (with carriers 47) will take up their stretch automatically, due to the weight of the take-up parts above referred to.

In general, my oven is constructed in the form of an inverted L, with the leg protruding to the rear of the oven, and of any suitable width. The waste space in the lower corner is utilized as a cake oven.

The angle bars 56 and 57 at the lower part of the oven chamber and the angle bars 58 at the top of the oven chamber, and also the angle bars 59 at the bottom of the auxiliary oven, support the heating elements 60. These heating elements are wired so that several different degrees of temperatures may be effected. The rotary switches 61, 62 and 63 are connected to the several heating elements by means of wires passing through the conduits 64, 65 and 66 respectively, and connected to the heating elements as shown in Fig. 11. The heating elements are of any ordinary construction, and hence not shown in detail. By referring to Fig. 11, the rotary switch 62 (as also are switches 61 and 63) is provided with a knurled knob 100 by means of which knob the electric current may be shut off; or low, medium or high temperatures may be given off by the heating elements 60. If the knob 100 points to "off," the electric current is shut off; if the knob 100 points to "low," one-quarter of the heat is given off by the heating elements marked by the Roman numerals I, II, III and IV; if the knob points to "medium," one-half the heating elements are shut off, namely I and IV, and hence only one-half the heat is given off; if the knob points to "high," all the heating elements I, II, III and IV will give off heat. Other modes of connecting the heating elements may be employed instead of that disclosed in Fig. 11. The electric wires are connected to the heating elements 60 by means of binding posts 98, and the heating elements are fastened to the angle bars 56, 57, 58 and 59 by means of bolts passing through the holes 99 in the heating elements.

A thermostat 67 of any suitable construction controls the heat in the heating chamber and keeps the temperature at a predetermined amount. The thermostat 67 and the rotary switches 61, 62 and 63 are mounted on a suitable panel 89.

At the front of the oven I have shown a thermometer 68, so that the oven operator may readily ascertain the temperature of the baking chamber.

At the rear end of the baking chamber 10 is a flue opening 69, to which is connected the flue 70, provided with a damper 71. This damper regulates the amount of used-up heat that is to escape and tends to keep the heated air in the baking chamber 10 in proper circulation. Damper 71 may be operated by any suitable means, or may be manually operated. If preferred by the operator, a fan for circulating the heated air may be substituted for the damper 71, such as disclosed in my pending patent, Serial No. 359,767, filed Feb. 19, 1920.

The steam generator consists of an outer casing 72 with perforations 97. At one end is the cap 92, and at the other end is the cap 93. Inside the casing 72 is the casing 73, similarly constructed with perforations 96 and end caps 94 and 95. Passing through the cap 94 is the water pipe 74. As the water enters the casing 73 it is partially converted into steam, and it then enters the casing 72 through the perforations 96. Said casing 72, being very hot, completes the operation of converting the water into steam, and the steam escapes into the baking chamber 10 through the perforations 97. Any suitable needle valve may be used to control the water supply to pipe 74 so that the correct amount of steam is generated to give the desired degree of humidity to the baking chamber 10.

I have shown my improved baker's oven as being driven by means of pulley 75 mounted on a pinion 76. This pulley 75 and pinion 76 are loosely mounted on the extension of shaft 37. Pinion 76 meshes with a gear 77 mounted on a pinion 78. This gear 77 and pinion 78 are loosely mounted on a stud 84 suitably mounted in the oven side 6 or any other suitable manner. Pinion 78 meshes with the gear 79 which is securely fastened to shaft 37, which is the main drive shaft. A collar 83 holds the pulley 75 and pinion 76 in place on said drive shaft 37. An electric motor 81 is shown mounted on plate 88 at the top of the oven. Said motor is provided with a pulley 80, over which travels the drive belt 82 and gives rotary motion to the drive pulley 75.

At the front of the oven I have shown upper and lower observation windows 85 and 86. Similar windows may also be placed at the rear of the oven. At the inside of observation windows 86 I have shown an electric light 87 so that the bread may readily be seen.

Various changes may be made in the arrangement and details of my invention without departing from the spirit of my invention as set forth in the following claims.

Having thus described my invention, what I claim as new, and desire to secure by Letters Patent, is—

1. In a traveling chain oven, an insulated baking chamber substantially in the form of an inverted L, in combination with an auxiliary oven beneath the upper protruding leg of the oven, and independently controlled heating elements in the baking chamber and the auxiliary oven, and variable regulating means whereby the heat from the baking chamber may be admitted to the auxiliary oven in any desired amount.

2. In a traveling chain oven, an insulated baking chamber substantially in the form of an inverted L, in combination with an auxiliary oven beneath the upper protruding leg of the oven, a pair of endless traveling chains carrying trays arranged to travel within said baking chamber, independently controlled heating elements in the baking chamber and the auxiliary oven, and variable regulating means whereby the heat from the baking chamber may be admitted to the auxiliary oven in any desired amount.

3. In a traveling chain oven, an insulated baking chamber substantially in the form of an inverted L, a pair of endless traveling chains carrying trays arranged to travel within said baking chamber, means to drive said traveling chains, and take-up means to take up the slack in the said endless traveling chains, said take-up means being both automatic and manually-operated as the operator may elect.

4. In a traveling chain oven, an insulated baking chamber substantially in the form of an inverted L, a pair of endless traveling chains carrying trays arranged to travel within said baking chamber, means to drive said traveling chains, independently controlled heating elements in the baking chamber, and damper means whereby circulation of the heated air in the baking chamber may be effected and the desired amount of burnt-up heat allowed to escape.

5. In a traveling chain oven, an insulated baking chamber substantially in the form of an inverted L, endless traveling chains carrying trays arranged to travel within said baking chamber, means to drive said traveling chains, observation windows in the body of the oven for determining the condition of the product being baked, and a vertical baffle plate in the front of said oven chamber to conserve the heat, substantially as described.

In testimony whereof I affix my signature.

WILLIAM F. SCHALLER.